United States Patent
Hoff et al.

(10) Patent No.: US 9,158,563 B2
(45) Date of Patent: Oct. 13, 2015

(54) DYNAMIC PLUGIN(S) FOR CLOUD APPLICATION(S)

(75) Inventors: Phillip M. Hoff, Duvall, WA (US); Anthony Lavel Crider, Mill Creek, WA (US); Sung Hon Wu, Bellevue, WA (US); Lubomir I. Birov, Redmond, WA (US); John A. Cunningham, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 13/431,131

(22) Filed: Mar. 27, 2012

(65) Prior Publication Data

US 2013/0263088 A1   Oct. 3, 2013

(51) Int. Cl.
   *G06F 9/44* (2006.01)
   *G06F 9/455* (2006.01)

(52) U.S. Cl.
   CPC .................... *G06F 9/45529* (2013.01)

(58) Field of Classification Search
   CPC ...................................... G06F 9/445
   USPC ......................................... 717/121
   See application file for complete search history.

(56) References Cited

U.S. PATENT DOCUMENTS

| | | | |
|---|---|---|---|
| 7,596,620 B1 | 9/2009 | Colton et al. | |
| 8,708,828 B2* | 4/2014 | Rowe et al. | 463/42 |
| 2002/0091990 A1* | 7/2002 | Little et al. | 717/105 |
| 2004/0205772 A1* | 10/2004 | Uszok et al. | 719/317 |
| 2008/0184135 A1* | 7/2008 | Washburn et al. | 715/752 |
| 2008/0320472 A1 | 12/2008 | Laska et al. | |
| 2009/0210702 A1 | 8/2009 | Welingkar et al. | |
| 2009/0259940 A1 | 10/2009 | Moraes | |
| 2010/0131084 A1* | 5/2010 | Van Camp | 700/86 |
| 2010/0153909 A1* | 6/2010 | Batey et al. | 717/104 |
| 2010/0329238 A1* | 12/2010 | Wilde et al. | 370/352 |
| 2011/0041066 A1* | 2/2011 | Kimmet | 715/736 |
| 2011/0209144 A1* | 8/2011 | Rowe et al. | 717/177 |
| 2011/0283269 A1* | 11/2011 | Gass et al. | 717/168 |
| 2012/0030671 A1* | 2/2012 | Matsubara et al. | 718/1 |
| 2012/0030672 A1* | 2/2012 | Zygmuntowicz et al. | 718/1 |
| 2013/0145361 A1* | 6/2013 | Kaegi | 717/176 |
| 2013/0263088 A1* | 10/2013 | Hoff et al. | 717/121 |

OTHER PUBLICATIONS

Cycrow, X-Universe—Plugin Manager, Cycrow.thexuniverse.us (Jun. 4, 2011) retrieved from https://web.archive.org/web/20110704112600/http://cycrow.thexuniverse.us/ on Dec. 1, 2014.*

(Continued)

*Primary Examiner* — Don Wong
*Assistant Examiner* — Theodore Hebert
(74) *Attorney, Agent, or Firm* — Ben Tabor; Kate Drakos; Micky Minhas

(57) ABSTRACT

Techniques are described herein that are capable of dynamically installing plugin(s) for application(s). An agent plugin is caused to run in a deployment of a specified application (e.g., across multiple machines in a cloud environment or "on premises"). The specified application is packaged to include the agent plugin. The agent plugin is used to install designated plugin(s) dynamically based on configuration information regarding the specified application. The configuration information indicates that the designated plugin(s) are to be installed in response to the specified application being deployed.

33 Claims, 7 Drawing Sheets

(56) References Cited

OTHER PUBLICATIONS

"Walkthrough: Register an Azure-aware Plug-in with Plug-in Registration Tool", Retrieved at http://msdn.microsoft.com/en-us/library/gg328524.aspx, Retrieved Date: Nov. 23, 2011, pp. 7.

Wei et al., "Aneka Cloud Application Platform and Its Integration with Windows Azure", Retrieved at http://cloudbus.org/papers/Aneka-AzurePlatform.pdf>>, Cloud Computing: Methodology, Systems, and Applications, Mar. 14, 2011, pp. 28.

Jie, et al., "A Profile-based Approach to Just-in-time Scalability for Cloud Applications", Retrieved at http://vlab.asu.edu:8080/attachments/177/A_Profile-Based_Approach_to_Just-in-Time_Scalability_for_Cloud_Applications.pdf>>, International Conference on Cloud Computing, Oct. 25, 2009, pp. 8.

"International Search Report", Mailed Date: Jun. 17, 2013, Application No. PCT/US2013/030307, Filed Date: Mar. 12, 2013, pp. 10.

* cited by examiner

DYNAMIC PLUGIN(S) FOR CLOUD APPLICATION(S)

BACKGROUND

A plugin is a software component that adds one or more designated capabilities to a software application. The plugin may be used to enable third-party developers to create abilities that extend the application, to support easily adding new features (e.g., profiling, diagnostics, etc.) to the application, to reduce the size of the application, etc. Developers traditionally include plugins in an application prior to deployment of the application. One limitation regarding conventional techniques for installing plugins is that the application owner, which is not necessarily the application developer, typically is not able to add, remove, and/or update the plugins based on current need without rebuilding and redeploying the application. Rebuilding and redeploying the application may be a time consuming and/or costly process. Also, such conventional techniques often provide many copies of the same plugin(s) packaged within many different applications, which may hamper wide-spread deployment of updated versions of the plugin(s). For instance, if a new version of a plugin fixes a security vulnerability, every application which was packaged with that plugin traditionally is repackaged and redeployed; this repackaging and redeploying may occur relatively slowly. Accordingly, the conventional techniques may result in increase package size, storage costs, and/or transmission costs.

In some conventional techniques, developers create their own startup tasks that utilize existing installation mechanisms (e.g., Web Platform Installer) to install pre-requisites (a.k.a. dependencies) of the application. A pre-requisite of an application is a software component that is not included in the application and that the application needs in order to properly run. For example, if the application is JAVA®-based, the JAVA® run time may be a pre-requisite of the application. In another example, if the application is a PHP™ application, the PHP™ run time may be a pre-requisite of the application. Each startup task often uses a script to call a command-line utility to install a particular product needed by the application. While using scripts in this manner may not be unduly burdensome for individual applications, the scripts typically are hand-written and tested by every developer, for each application. No standard, general, robust mechanism is known for installing such components. Furthermore, if the application requires a different set of pre-requisites (e.g., a new version of a pre-requisite), it may be necessary to rebuild and redeploy the application in order to install and execute the different set of pre-requisites. Again, no standard, general, robust mechanism exists for installing such components post-deployment.

SUMMARY

Various approaches are described herein for, among other things, dynamically installing plugin(s) for application(s). A method is described in which configuration information regarding a specified application is identified. The configuration information indicates that designated plugin(s) selected from one or more plugins, which are stored in a location that is accessible to deployed applications, are to be installed in response to the specified application being deployed. An agent plugin is caused to run in a deployment of the specified application. For example, the deployment may be performed across multiple machines in a cloud environment. In another example, the deployment may be performed "on premises" (i.e., on one or more local machines). The specified application is packaged to include the agent plugin. The agent plugin is used to install the designated plugin(s) dynamically based on the configuration information. Accordingly, such designated plugin(s) are interchangeably referred to herein as "dynamic plugin(s)".

A system is described that includes an identification module, a causation module, and an installation module. The installation module is configured to identify configuration information regarding a specified application. The configuration information indicates that designated plugin(s) selected from one or more plugins, which are stored in a location that is accessible to deployed applications, are to be installed in response to the specified application being deployed. The causation module is configured to cause an agent plugin to run in a deployment of the specified application (e.g., across multiple machines in a cloud environment or "on premises"). The specified application is packaged to include the agent plugin. The installation module is configured to use the agent plugin to install the designated plugin(s) dynamically based on the configuration information.

A computer program product is described that includes a computer-readable medium having computer program logic recorded thereon for enabling a processor-based system to dynamically install designated plugin(s) with respect to a specified application. The computer program product includes first, second, and third program logic modules. The first program logic module is for enabling the processor-based system to identify configuration information regarding the specified application. The configuration information indicates that the designated plugin(s) selected from one or more plugins, which are stored in a location that is accessible to deployed applications, are to be installed in response to the specified application being deployed. The second program logic module is for enabling the processor-based system to cause an agent plugin to run in a deployment of the specified application (e.g., across multiple machines in a cloud environment or "on premises"). The specified application is packaged to include the agent plugin. The third program logic module is for enabling the processor-based system to use the agent plugin to install the designated plugin(s) dynamically based on the configuration information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
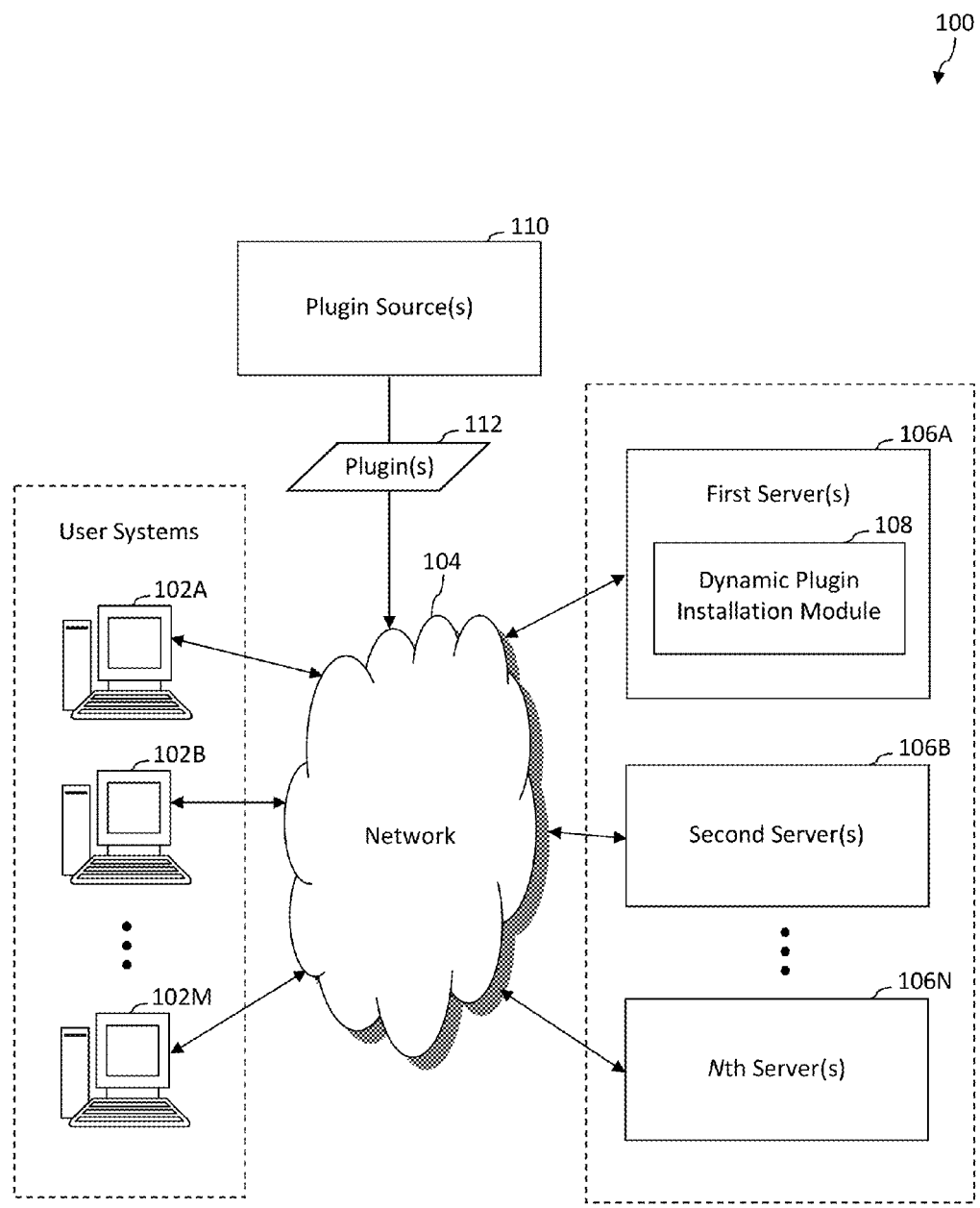
FIG. 1 is a block diagram of an example computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of dynamically installing plugin(s) for application(s). In accordance with the example embodiments, an agent plugin is caused to run in a deployment of a specified application. For example, the deployment may be performed across multiple machines in a cloud environment. In another example, the deployment may be performed "on premises" (i.e., on one or more local machines). The specified application is packaged to include the agent plugin. The agent plugin is used to install designated plugin(s) dynamically based on configuration information regarding the specified application. Accordingly, such designated plugin(s) are interchangeably referred to herein as "dynamic plugin(s)". The configuration information indicates that the designated plugin(s) are to be installed in response to the specified application being deployed.

Example techniques described herein have a variety of benefits as compared to conventional techniques for installing plugins. For instance, the example techniques may enable a user (e.g., an application developer, an application owner, etc.) to add, remove, and/or update plugins and/or dependencies of an application with regard to a deployment of the application based on current need without requiring a rebuild and/or redeployment of the application. For instance, the example techniques may provide a standard, general, robust mechanism for installing the plugins and/or the dependencies (e.g., after the application has been deployed). Accordingly, the example techniques may consume less time and/or fewer resources than conventional techniques. For example, using the techniques described herein may result in smaller package size, lesser storage costs, and/or lesser transmission costs as compared to conventional techniques.

FIG. 1 is a block diagram of an example computer system 100 in accordance with an embodiment. Generally speaking, computer system 100 operates to provide information to users (e.g., application developers) in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, computer system 100 dynamically installs plugin(s) for application(s). For instance, if an application developer develops an application using computer system 100, computer system 100 may cause an agent plugin to run in a deployment of the application and then use the agent plugin to dynamically install selected plugin(s) for the application. Detail regarding techniques for dynamically installing plugin(s) for application(s) is provided in the following discussion.

As shown in FIG. 1, computer system 100 includes a plurality of user systems 102A-102M, a network 104, a plurality of servers 106A-106N, and plugin source(s) 110. Communication among user systems 102A-102M, servers 106A-106N, and plugin source(s) 110 is carried out over network 104 using well-known network communication protocols. Network 104 may be a wide-area network (e.g., the Internet), a local area network (LAN), another type of network, or a combination thereof.

Plugin source(s) 110 are processing systems that are capable of communicating with servers 106A-106N. An example of a processing system is a system that includes at least one processor that is capable of manipulating data in accordance with a set of instructions. For instance, a processing system may be a computer, a personal digital assistant, etc. Plugin source(s) 110 are configured to provide plugin(s) 112 for further processing by a dynamic plugin installation module 108, which is discussed in greater detail below. For instance, plugin source(s) 110 may provide the plugin(s) 112 in response to receiving requests for the plugin(s) 112 from dynamic plugin installation module 108.

User systems 102A-102M are processing systems that are capable of communicating with servers 106A-106N. User systems 102A-102M are configured to provide requests to servers 106A-106N for requesting information stored on (or otherwise accessible via) servers 106A-106N. For instance, a user may initiate a request for executing a computer program using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M and plugin source(s) 110. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of computer system 100.

First server(s) 106A is shown to include dynamic plugin installation module 108. Dynamic plugin installation module 108 is configured to forward the plugin(s) 112, which are received from plugin source(s) 110, to a location that is accessible to deployed applications. For instance, dynamic plugin installation module 108 may receive the plugin(s) 112 in response to providing requests for the plugin(s) 112 to plugin source(s) 110. Dynamic plugin installation module 108 is further configured to identify configuration information regarding a specified application. The configuration information indicates that designated plugin(s) selected from the plugin(s) 112, which are stored in the location that is accessible to deployed applications, are to be installed in response to the specified application being deployed. Dynamic plugin installation module 108 is further configured to cause an agent plugin to run in a deployment of the specified application (e.g., across multiple machines in a cloud environment or "on premises"). The specified application is packaged to include the agent plugin. Dynamic plugin installation module 108 is further configured to use the agent plugin to install the designated plugin(s) dynamically based on the configuration information. Some example techniques for dynamically installing plugin(s) for application(s) are discussed in greater detail below with reference to FIGS. 2-10.

It should be noted that an instance of dynamic plugin installation module 108 is included on each server that comprises the specified application. Each instance of dynamic plugin installation module 108 causes the agent plugin to install and run dynamic plugin(s) on the machine on which dynamic plugin installation module 108 is included.

Dynamic plugin installation module 108 is shown to be incorporated in first server(s) 106A for illustrative purposes and is not intended to be limiting. It will be recognized that instance(s) of dynamic plugin installation module 108 may be incorporated in any one or more of the servers 106A-106N.

Dynamic plugin installation module 108 may be implemented in various ways to dynamically install plugin(s) for application(s), including being implemented in hardware, software, firmware, or any combination thereof. For example, dynamic plugin installation module 108 may be implemented as computer program code configured to be executed in one or more processors. In another example, dynamic plugin installation module 108 may be implemented as hardware logic/electrical circuitry. In an embodiment, dynamic plugin installation module 108 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
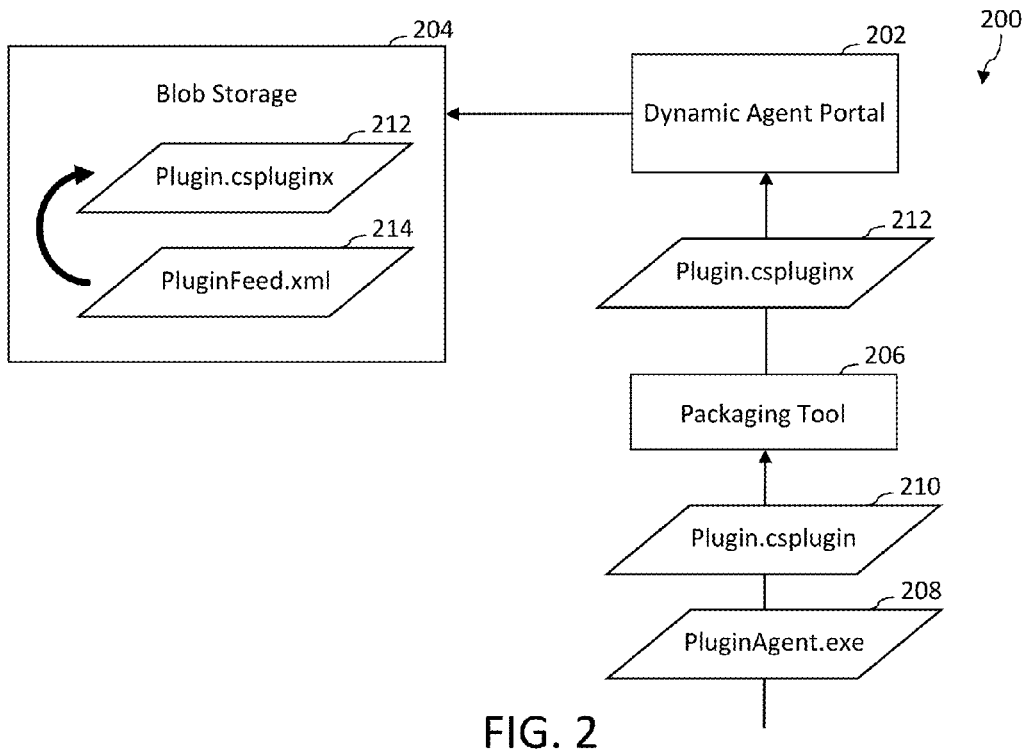
FIG. 2 is a block diagram of an example implementation of a dynamic plugin installation module shown in FIG. 1 that illustrates submission of a plugin for use by a developer in an application in accordance with an embodiment.

FIGS. 2-5 depict dynamic plugin installation modules 200, 300, 400, and 500, which are example implementations of dynamic plugin installation module 108 shown in FIG. 1, according to embodiments. FIG. 2 illustrates submission of a plugin for use by a developer in an application in accordance with an embodiment. As shown in FIG. 2, dynamic plugin installation module 200 includes a dynamic agent portal 202, a blob storage 204, and a packaging tool 206. Dynamic agent portal 202 interprets requests (e.g., instructions) from developers to add plugins to blob storage 204, to update plugins that are stored in blob storage 204, and/or to remove plugins from blob storage 204 based on the requests. For example, dynamic agent portal 202 may add a designated plugin to blob storage 204 in accordance with an upload request from a first developer. Dynamic agent portal 202 may update the designated plugin in accordance with update request(s) from the first developer and/or other developer(s). Dynamic agent portal 202 may remove the designated plugin from blob storage 204 in accordance with a removal request from the first developer or another developer. Each of the plugins may have any suitable functionality. For instance, one or more of the plugins may perform diagnostic operations (e.g., monitoring for problem(s), identifying source(s) of problem(s), debugging, profiling, controlling, etc.) with respect to an application.

A plugin may include any suitable number of components (e.g., files). For instance, a plugin may include one or more executable binaries, one or more supporting libraries, a plugin manifest, etc. A plugin manifest is a file (e.g., an extensible markup language (XML) file) that describes configurations (e.g., settings) of a plugin. For instance, the plugin manifest may indicate which configuration values are needed for the plugin. Dynamic agent portal 202 may provide a user interface that enables a user to specify the configuration values that correspond to the respective configurations of the plugin.

As shown in FIG. 2, a plugin 212 labeled "Plugin.csplug-inx" includes a first file 208 labeled "PluginAgent.exe" and a second file 210 labeled "Plugin.csplugin" for illustrative purposes. Packaging tool 206 is capable of combining the files 208 and 210 to create the plugin 212, as shown in FIG. 2. It will be recognized, however, that the developer may combine the files 208 and 210 to create the plugin 212.

Regardless, the plugin 212 is uploaded via dynamic agent portal 202. For instance, the developer may upload the plugin 212 using a client deployed on a user system (e.g., one of user systems 102A-102M). The plugin 212 may be configured to have any suitable format (e.g., a format that is based on the Open Packaging Conventions). Packaging tool 206 may package the plugin 212 into the aforementioned format before the plugin 212 is uploaded via dynamic agent portal 202. In one example embodiment, packaging tool 206 provides an online form to the developer for completion before the plugin 212 is uploaded via dynamic agent portal 202. In another example embodiment, dynamic agent portal 202 provides the online form to the developer.

Dynamic agent portal 202 generates a feed 214, labeled "PluginFeed.xml", that includes the plugin 212, location information regarding a location of the plugin 212, and installation information that includes instructions for installing the plugin 212. The feed may be a web platform installer (WebPI) feed, for example, though it will be recognized that the feed may be any suitable type of feed. A web PI feed is a configuration file that enables a web platform installer to be able to locate and install plugins and/or dependencies that the web platform installer is instructed to install. In one example, the plugin 212 may be defined as a virtual product within the feed 214. In accordance with this example, the virtual product identifies dependencies of the plugin 212. The installation information may include instructions for decompressing the plugin 212. The feed 214 may be web platform installer compatible, though the scope of the example embodiments is not limited in this respect. One non-limiting example of a code snippet that defines a feed is provided in section III.A below for illustrative purposes. Dynamic agent portal 202 provides the plugin 212 and the feed 214 to blob storage 204.

Blob storage 204 is a public, network-accessible (e.g., web-accessible) store. Blob storage 204 stores the plugin 212 and the feed 214, along with any other plugins that are uploaded via dynamic agent portal 202 and their corresponding feeds. Blob storage 204 may be any suitable type of store. One type of store is a database. For instance, blob storage 204 may be a relational database, an entity-relationship database, an object database, an object relational database, an extensible markup language (XML) database, etc.

Figure 3:
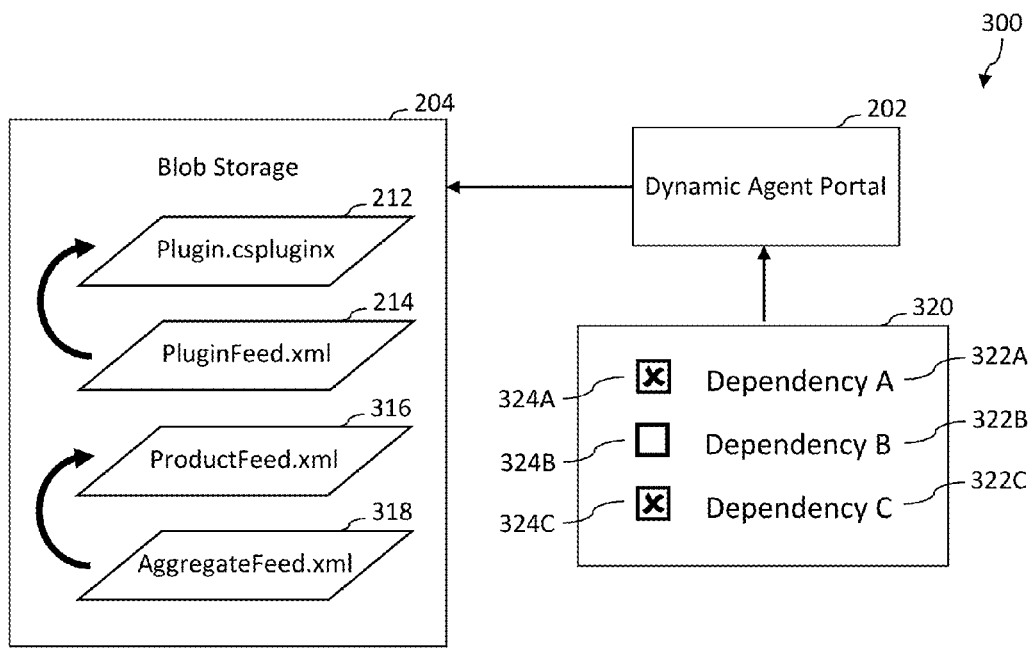
FIG. 3 is a block diagram of an example implementation of a dynamic plugin installation module shown in FIG. 1 that illustrates selection of dependencies of an application by a developer in accordance with an embodiment.

FIG. 3 illustrates selection of dependencies of an application by a developer in accordance with an embodiment. As shown in FIG. 3, dynamic plugin installation module 300 includes dynamic agent portal 202, blob storage 204, and an interface 320. Dynamic agent portal 202 and blob storage 204 are capable of operating as described above with reference to FIG. 2. Dynamic agent portal 202 interprets requests (e.g., instructions) from developers to install dependencies with regard to the application.

Interface 320 provides a visual representation of dependencies that are available for installation with regard to the application. For instance, interface 320 shows visual representations 322A, 322B, and 322C of respective dependencies A, B, and C. Selection boxes 324A-324C correspond to respective dependencies A, B, and C. The user may select selection box 324A to cause dependency A to be installed with regard to the application; the user may select selection box 324B to cause dependency B to be installed with regard to the application, and so on.

As shown in FIG. 3, selection boxes 324A and 324C are selected, and selection box 324B is not selected. Accordingly dynamic agent portal 202 generates a product feed 316, labeled "ProductFeed.xml", to include dependencies A and C and not to include dependency B. Dynamic agent portal 202 generates an aggregated feed 318, labeled "AggregatedFeed.xml", to include feeds 214 and 316. The feeds 316 and 318 may be web platform installer compatible, though the scope of the example embodiments is not limited in this respect. Dynamic agent portal 202 provides the feeds 316 and 318 to blob storage 204.

Blob storage 204 stores feeds 316 and 318, along with the plugin 212 and feed 214. Each of the feeds stored by blob storage 204 may correspond to a known dependency or an unknown dependency. A known dependency is a dependency that is known at a time at which the application is developed. For instance, an execution framework, such as a Java® execution framework, is one example type of known dependency. An unknown dependency is a dependency that is not known at the time at which the application is developed. For instance, a performance measurement plugin may constitute an unknown dependency. It should be noted that an unknown dependency may be selected for installation with regard to the application after deployment of the application is initiated.

Figure 4:
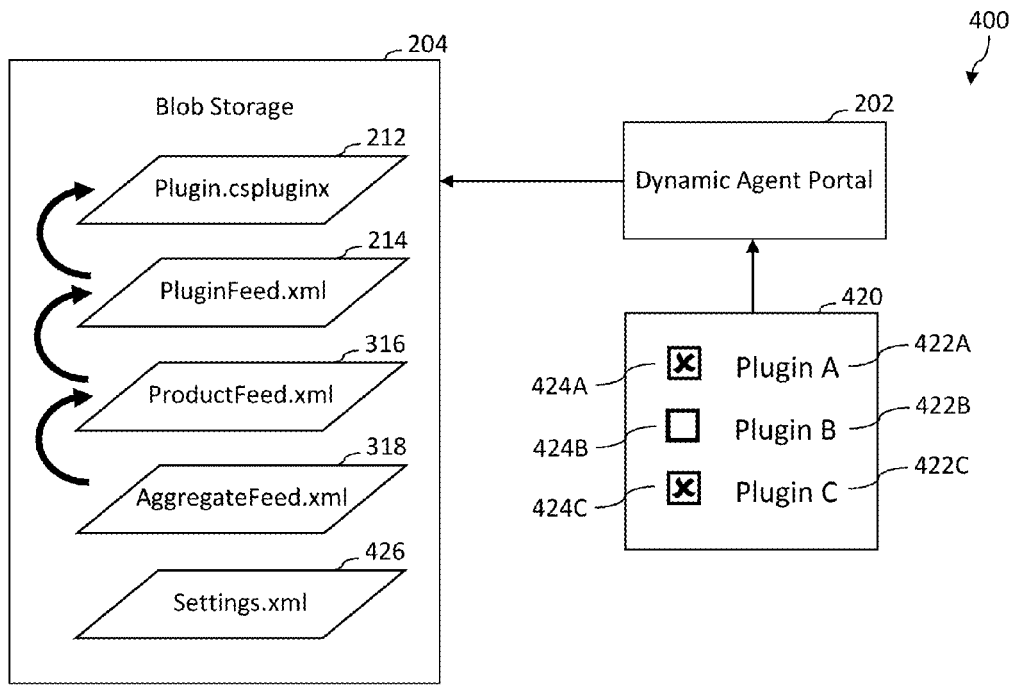
FIG. 4 is a block diagram of an example implementation of a dynamic plugin installation module shown in FIG. 1 that illustrates selection of plugins for an application by a developer in accordance with an embodiment.

FIG. 4 illustrates selection of plugins for an application by a developer in accordance with an embodiment. As shown in FIG. 4, dynamic plugin installation module 400 includes dynamic agent portal 202, blob storage 204, and an interface 420. Dynamic agent portal 202 and blob storage 204 are capable of operating as described above with reference to FIGS. 2 and 3. Dynamic agent portal 202 interprets requests (e.g., instructions) from developers to install plugins with regard to the application.

Interface 420 provides a visual representation of plugins that are available for installation with regard to the application. For instance, interface 420 shows visual representations 422A, 422B, and 422C of respective plugins A, B, and C. Selection boxes 424A-424C correspond to respective plugins A, B, and C. The user may select selection box 424A to cause plugin A to be installed with regard to the application; the user may select selection box 424B to cause plugin B to be installed with regard to the application, and so on. The user may configure the plugins (e.g., specify settings of the plugins), as well.

As shown in FIG. 4, selection boxes 424A and 424C are selected, and selection box 424B is not selected. Accordingly dynamic agent portal 202 modifies the product feed 316 to include the plugin feeds for plugins A and C. Note that the plugin feed for plugin B is not added to the product feed 316 because selection box 424B is not selected. Dynamic agent portal 202 generates settings 426, labeled "Settings.xml", regarding plugins A and C in response to selection boxes 424A and 424C being selected and/or in response to receiving configuration instructions from the user. Dynamic agent portal 202 provides the settings 426 to blob storage 204 to be stored therein.

Dynamic agent portal 202 may not store the settings 426 in an explicitly public location. For instance, the settings 426 may include sensitive data (e.g. database connection strings). In one example technique for maintaining securing of such sensitive data, a globally unique identifier-based (GUID-based) URI is used in a non-browsable container to store the settings 426. Although the URI technically is public, accessing the URI by brute force methods is relatively infeasible. It will be recognized that this is merely one example technique, and other technique(s) may be employed in addition to or in lieu of this example technique.

A non-limiting example of a code snippet that defines a feed generated by the selection of two plugins is provided in section III.B below for illustrative purposes. A non-limiting example of a code snippet that defines a configuration file generated by the selection of two plugins is provided in section III.C below for illustrative purposes.

Figure 5:
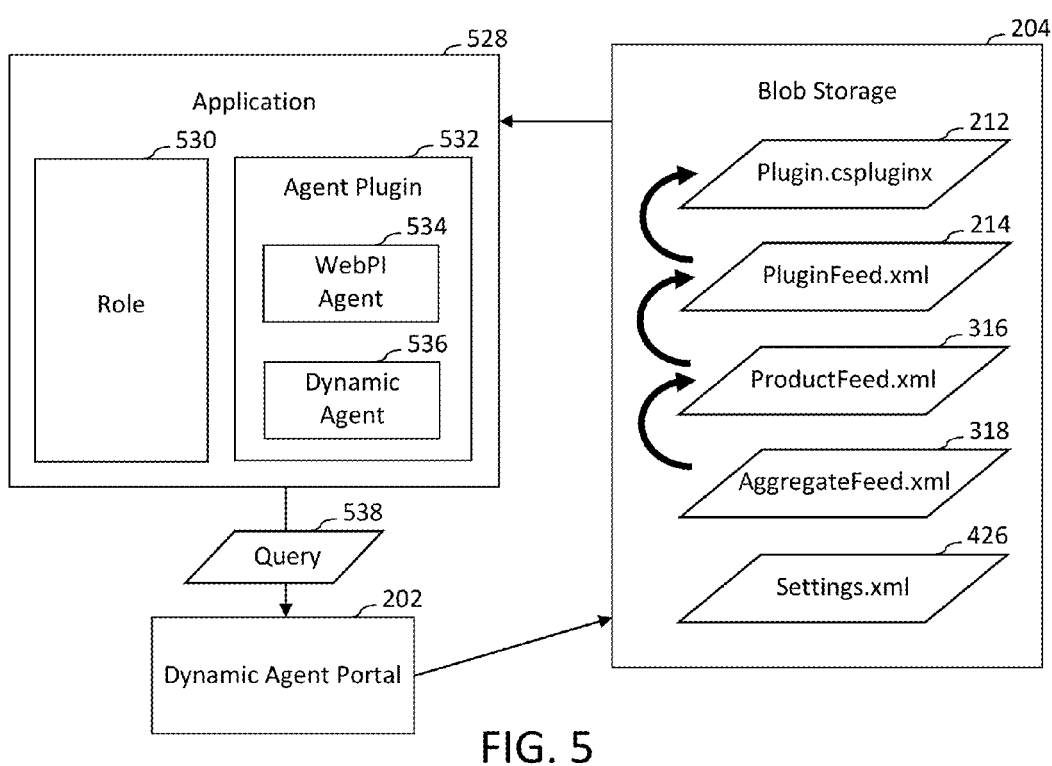
FIG. 5 is a block diagram of an example implementation of a dynamic plugin installation module shown in FIG. 1 that illustrates installation and execution of the dependencies and the plugins that are selected as shown in respective FIGS. 3 and 4 in accordance with an embodiment.

FIG. 5 illustrates installation and execution of the dependencies and the plugins that are selected as shown in respective FIGS. 3 and 4 in accordance with an embodiment. As shown in FIG. 5, dynamic plugin installation module 500 includes dynamic agent portal 202 and blob storage 204, which are capable of operating as described above with reference to FIGS. 2-4. An application 528 is shown in FIG. 5 to include a role 530 and an agent plugin 532. The role 530 defines operation of the application 528. The agent plugin 532 acts as an agent for the application 528. For instance, the agent plugin 532 provides a capability to dynamically understand a topology of a network on which the application 528 is installed. Because machines (e.g., physical machines and/or virtual machine) in a cloud environment often lie behind a firewall, the topology of the application 528 may be rather difficult to determine directly. Accordingly, the agent plugin 532 is responsible for determining what constituent virtual machines that are associated with the application 528 include. Once the topology of the application 528 is determined, agent plugin 532 may deploy other plugins, dependencies of those plugins, and dependencies of the application to the relevant locations and then initialize and run those plugins and dependencies.

The agent plugin 532 includes a WebPI agent 534 and a dynamic agent 536 for illustrative purposes and is not intended to be limiting. The WebPI agent 534 is configured to install the dependencies and the plugins that are selected as shown in respective FIGS. 3 and 4. The dynamic agent 536 is configured to execute the plugins that are selected as shown in respective FIGS. 3 and 4.

WebPI agent 534 uses libraries and an application programming interface (API) of the web platform installer to read the aggregated feed 318 to determine which dependencies and plugins to download and install. For instance, WebPI agent 534 provides a query (e.g., query 538) to dynamic agent portal 202. The query includes a request for the aggregated feed 318 and a deployment identifier (ID) that is associated with the deployment of the application 528. Dynamic agent portal 202 redirects the query to a storage location in blob storage 204 that corresponds to a uniform resource identifier (URI), such as a uniform resource locator (URL) or a uniform resource name (URN), that is based on the deployment ID in the query. WebPI agent 534 downloads the aggregated feed 318 from the storage location that corresponds to the URI for installation of the dependencies and the plugins that are selected as shown in respective FIGS. 3 and 4.

In one example, WebPI agent 534 may be configured within the application 528 to use a predetermined feed to install a predetermined set of products (e.g., one or more dependencies and/or one or more plugins) from that feed or a "default" product if no product is specified by the predetermined feed. The default product may be indicated by an association of a "default" keyword to the product within the predetermined feed.

In another example, if WebPI agent 534 is not specifically configured, WebPI agent 534 may request a feed from a web application. WebPI agent 534 may provide the deployment ID that is associated with the deployment of the application 528, causing the web application to redirect WebPI agent 534 to the feed associated with the deployment. If no feed is specified or no feed is associated with the deployment of the application 528, WebPI agent 534 may not install the dependencies and/or the plugins that are selected as shown in respective FIGS. 3 and 4.

Dynamic agent 536 provides a query (e.g., query 538) to dynamic agent portal 202. The query includes a request for the settings 426 and a deployment identifier (ID) that is associated with the deployment of the application 528. Dynamic agent portal 202 redirects the query to the storage location in blob storage 204 that corresponds to the URI that is based on the deployment ID in the query. Dynamic agent 536 downloads the settings 426 from the storage location that corresponds to the URI for execution of the plugins that are selected as shown in FIG. 4. The settings 426 may (or may not) include settings regarding the dependencies.

In one example, dynamic agent 536 may be configured within the application 528 to use a predetermined configuration file that identifies the plugins to execute and configuration settings of those plugins. In another example, if dynamic agent 536 is not specifically configured, dynamic agent 536 may request a configuration file from a web application. Dynamic agent 536 may provide the deployment ID that is associated with the deployment of the application 528, causing the web application to redirect dynamic agent 536 to the configuration file associated with the deployment. If no configuration file is specified or no configuration file is associated with the deployment of the application 528, dynamic agent 536 may not execute the plugins that are selected as shown in respective FIGS. 3 and 4.

In an example embodiment, for each configured plugin, dynamic agent 536 locates the corresponding plugin manifest (e.g., on the local machine). Dynamic agent 536 then executes each of the binaries indicated within the manifest. If there are configuration settings associated with the plugin, dynamic agent 536 passes the configuration settings to the plugin via environment variables. If an instruction to wait for the plugin to discontinue execution is specified in the plugin manifest, dynamic agent 536 waits for that plugin to discontinue execution. Otherwise, dynamic agent 536 moves on to the next configured plugin. When all configured plugins have been executed, dynamic agent 536 discontinues execution.

In another example embodiment, the operation of dynamic agent 536 mimics the behavior of the bootstrapper process of the platform that runs the plugins packaged with the application 528. Dynamic agent 536 may thereby reduce (e.g., minimize) architectural differences between plugins run as part of the application 528 and plugins run as part of this dynamic scenario. Some plugins may be capable of execution in both environments with no changes to the plugins.

It should be noted that the topology of the network on which the application 528 is installed may pull information from dynamic agent portal 202 to then configure itself based on the settings that are in dynamic agent portal 202. This is different from the push techniques that traditionally are employed for attempting to discover network topology.

FIGS. 6-9 depict flowcharts 600, 700, 800, and 900 of example methods for dynamically installing plugin(s) for application(s) in accordance with embodiments. Flowcharts 600, 700, 800, and 900 may be performed by dynamic plugin installation module 108 of system 100 shown in FIG. 1, for example. For illustrative purposes, flowcharts 600, 700, 800, and 900 are described with respect to dynamic plugin installation module 1000 shown in FIG. 10, which is another example of dynamic plugin installation module 108, according to an embodiment. As shown in FIG. 10, dynamic plugin installation module 1000 includes an identification module 1002, a causation module 1004, an installation module 1006, an execution module 1008, an interface module 1010, a selection module 1012, a generation module 1014, a determination module 1016, and a store 1018. Further structural and operational embodiments will be apparent to persons skilled in the relevant art(s) based on the discussion regarding flowcharts 600, 700, 800, and 900.

Figure 6:
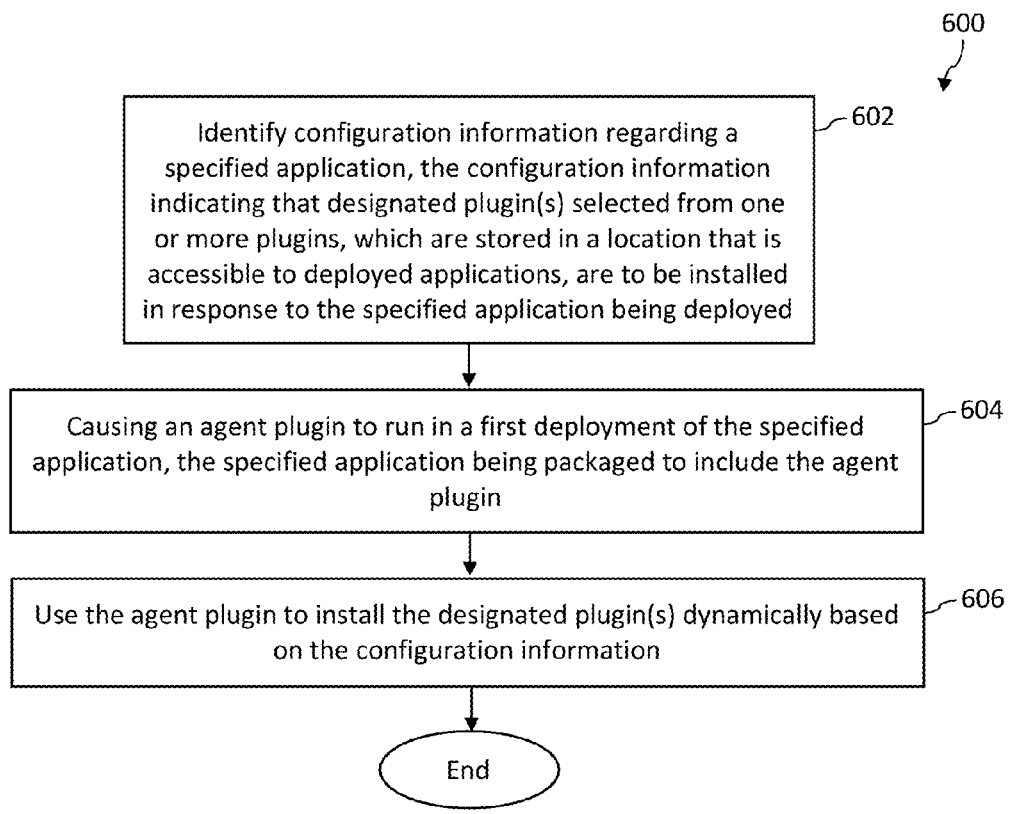
FIGS. 6-9 depict flowcharts of example methods for dynamically installing plugin(s) for application(s) in accordance with embodiments.

As shown in FIG. 6, the method of flowchart 600 begins at step 602. In step 602, configuration information regarding a specified application is identified. The configuration information indicates that designated plugin(s) selected from one or more plugins, which are stored in a location that is accessible to deployed applications, are to be installed in response to the specified application being deployed. The configuration information may be application-specific configuration information that is specific to the specified application. For instance, the configuration information may define content of the specified application in terms of its installation file and/or a description of the specified application for human consumption. In an example implementation, identification module 1002 identifies configuration information 1026. Configuration information 1026 indicates that designated plugin(s) 1034 selected from plugin(s) 1022, which are stored in store 1018, are to be installed in response to specified application 1030 being deployed. It will be recognized that in some example embodiments, the configuration information indicates that no designated plugins to be installed and/or executed.

At step 604, an agent plugin is caused to run in a first deployment of the specified application (e.g., across machines in a cloud environment or "on premises"). The specified application is packaged to include the agent plugin. In an example implementation, causation module 1004 causes agent plugin 1032 to be run in a first deployment of the specified application 1030. In accordance with this implementation, the specified application 1030 is packaged to include the agent plugin 1032.

At step 606, the agent plugin is used to install the designated plugin(s) dynamically (e.g., on-the-fly while the specified application is running) based on the configuration information. In an example implementation, installation module uses the agent plugin 1032 to install the designated plugin(s) 1034 dynamically based on the configuration information 1026.

In an example embodiment, step 602 includes identifying a feed that includes the designated plugin(s), location information regarding a location of the designated plugin(s), and installation information that includes instructions for installing the designated plugin(s). For instance, identification module 1002 may identify the feed. In accordance with this embodiment, the agent plugin is used to install the designated plugin(s) dynamically at step 606 based on the location information and the installation information. For instance, installation module 1006 may use the agent plugin 1032 to install the designated plugin(s) 1034 dynamically based on the location information and the installation information. It will be recognized that the feed may further include one or more dependencies of the specified application. For instance, the one or more dependencies of the specified application may be a superset of the designated plugin(s).

In some example embodiments, one or more steps 602, 604, and/or 606 of flowchart 600 may not be performed. Moreover, steps in addition to or in lieu of steps 602, 604, and/or 606 may be performed. For instance, in an example embodiment, the configuration information further indicates one or more dependencies of the specified application. It will be recognized that any of the one or more dependencies may have one or more dependencies, any of which may have one or more dependencies, and so on. Accordingly, each dependency may have its own one or more dependencies. In accordance with this embodiment, the method of flowchart 600 further includes using the agent plugin to install the one or more dependencies based on the configuration information. In an example implementation, installation module 1006 uses the agent plugin 1032 to install the one or more dependencies based on the configuration information 1026.

In another example embodiment, the configuration information further indicates one or more dependencies of the designated plugin(s). In accordance with this embodiment, the method of flowchart 600 further includes using the agent plugin to install the one or more dependencies of the designated plugin(s) based on the configuration information. For instance, the one or more dependencies may be stored in store 1018.

In yet another example embodiment, each of the designated plugin(s) includes a respective collection of executable binaries. An executable binary is a binary that is executable. In accordance with this embodiment, the configuration information indicates for each of the designated plugin(s) a respective subset of the respective collection of executable binaries. Each subset of a respective collection of executable binaries may include any one or more of the executable binaries in the respective collection (e.g., fewer than all of the executable binaries, all of the executable binaries, none of the executable binaries, etc.). In further accordance with this embodiment, the method of flowchart 600 further includes using the agent plugin to execute each subset based on the configuration information. In an example implementation, execution module 1008 uses the agent plugin 1032 to execute each subset based on the configuration information 1026. In one example, installation module 1006 may generate an installation indicator 1020 in response to the designated plugin(s) 1034 being installed. For instance, the installation indicator 1020 may indicate that the designated plugin(s) 1034 are installed. In accordance with this example, execution module 1008 may use the agent plugin 1032 to execute each subset in response to receiving the installation indicator 1020 from installation module 1006.

It is noted that any one or more of the designated plugin(s) may include a single executable binary. It is further noted that any one or more of the designated plugin(s) may include one or more supplementary (e.g., library) binaries in addition to the executable binar(ies).

In still another example embodiment, step 602 includes identifying a predetermined configuration file. The predetermined configuration file may be included in the configuration information, though the scope of the example embodiments is not limited in this respect. For instance, identification module 1002 may identify the predetermined configuration file (e.g., configuration file 10036), which may be included in the configuration information 1026. In accordance with this embodiment, the predetermined configuration file indicates at least one configuration setting for each of the designated plugin(s). For instance, the configuration information 1026 may indicate configuration setting(s) for each of the designated plugin(s) 1034. In one example, a configuration setting may specify a frequency with which the specified application is to be accessed for purposes of monitoring. In accordance with this example, the configuration setting may specify that the application is to be accessed every ten seconds, or every 5 microseconds, or every 30 minutes, etc. In further accordance with this embodiment, the method of flowchart 600 further includes using the agent plugin to execute the designated plugin(s) based on the predetermined configuration file in response to using the agent plugin to install the designated plugin(s). In an example implementation, execution module 1008 uses the agent plugin 1032 to execute the designated plugin(s) 1034 based on the predetermined configuration file. In one example, the predetermined configuration file may be different from another file that indicates that at least one designated plugin is to be installed in response to the specified application being deployed. In another example, the configuration information that indicates that at least one designated plugin is to be installed in response to the specified application being deployed may be includes in the predetermined configuration file.

In yet another example embodiment, step 602 includes requesting a configuration file that corresponds to the first deployment of the specified application from a web application via which the configuration file is generated. For instance, identification module 1002 may provide a file request 1028, which requests a configuration file 1036 that corresponds to the first deployment of the specified application 1030 from the web application. In accordance with this embodiment, step 602 further includes receiving the configuration file from the web application. The configuration file may be included in the configuration information, though the scope of the example embodiments is not limited in this respect. The configuration file indicates at least one configuration setting for each of the designated plugin(s). For example, execution module 1008 may receive the configuration file 1036 from the web application. In further accordance with this embodiment, the method of flowchart 600 further includes using the agent plugin to execute the designated plugin(s) based on the configuration file in response to using the agent plugin to install the designated plugin(s). In an example implementation, execution module 1008 uses the agent plugin 1032 to execute the designated plugin(s) 1034 based on the configuration file 1036. In one example, the configuration file may be different from another file that indicates that at least one designated plugin is to be installed in response to the specified application being deployed. In another example, the configuration information that indicates that at least one designated plugin is to be installed in response to the specified application being deployed may be includes in the configuration file.

Figure 7:
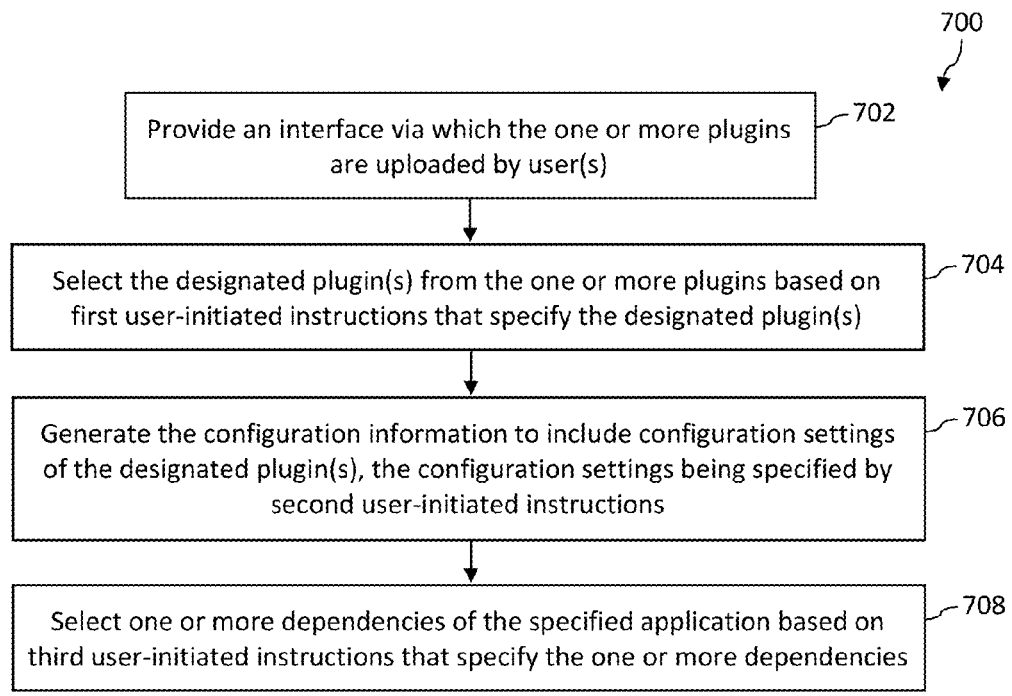

In an example embodiment, the method of flowchart 600 includes one or more of the steps shown in FIG. 7. As shown in FIG. 7, the method of flowchart 700 begins at step 702. In step 702, an interface is provided via which the one or more plugins are uploaded by user(s). In an example implementation, interface module 1010 provides interface 1038. For instance, the interface 1038 may have been used by the user(s) to upload the plugin(s) 1022.

At step 704, the designated plugin(s) are selected from the one or more plugins based on first user-initiated instructions that specify the designated plugin(s). In an example implementation, selection module 1012 selects the designated plugin(s) 1034 from the plugin(s) 1022 based on the first user-initiated instructions. For example, selection module 1012 may generate selection request 1040 to specify the designated plugin(s) 1034 based on the first user-initiated instructions. In accordance with this example, selection module 1012 may provide the selection request 1040 to store 1018 to select the designated plugin(s) 1034 from the plugin(s) 1022.

At step 706, the configuration information is generated to include configuration settings of the designated plugin(s). The configuration settings are specified by second user-initiated instructions. In an example implementation, generation module 1014 generates the configuration information 1026 to include configuration settings of the designated plugin(s) 1034, which are specified by the second user-initiated instructions.

At step 708, one or more dependencies of the specified application are selected based on third user-initiated instructions that specify the one or more dependencies. In an example implementation, selection module 1012 selects one or more dependencies of the specified application 1030 based on the third user-initiated instructions.

Figure 8:
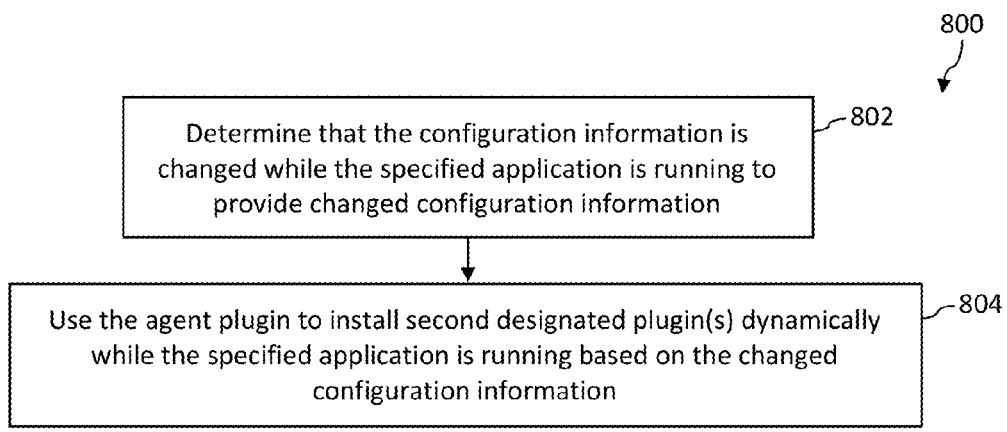

In another example embodiment, the method of flowchart 600 includes one or more of the steps shown in FIG. 8. As shown in FIG. 8, the method of flowchart 800 begins at step 802. In step 802, a determination is made that the configuration information is changed while the specified application is running to provide changed configuration information. The changed configuration information indicates that second designated plugin(s) are to be installed. The configuration information prior to being changed does not indicate that the second designated plugin(s) are to be installed. In an example implementation, determination module 10016 determines that the configuration information 1026 is changed while the specified application 1030 is running to provide the changed configuration information.

At step 804, the agent plugin is used to install the second designated plugin(s) dynamically while the specified application is running based on the changed configuration information. In an example implementation, installation module 1006 uses the agent plugin 1032 to install the second designated plugin(s) dynamically while the specified application 1030 is running.

Figure 9:
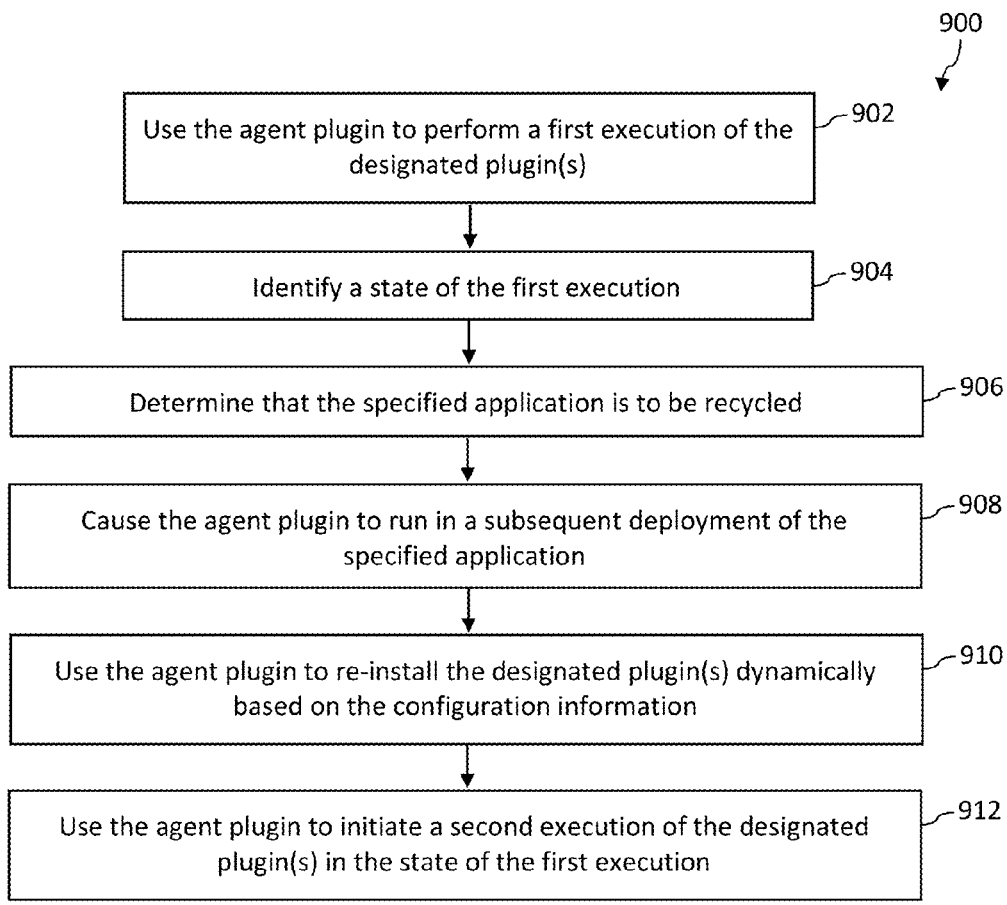
Figure 10:
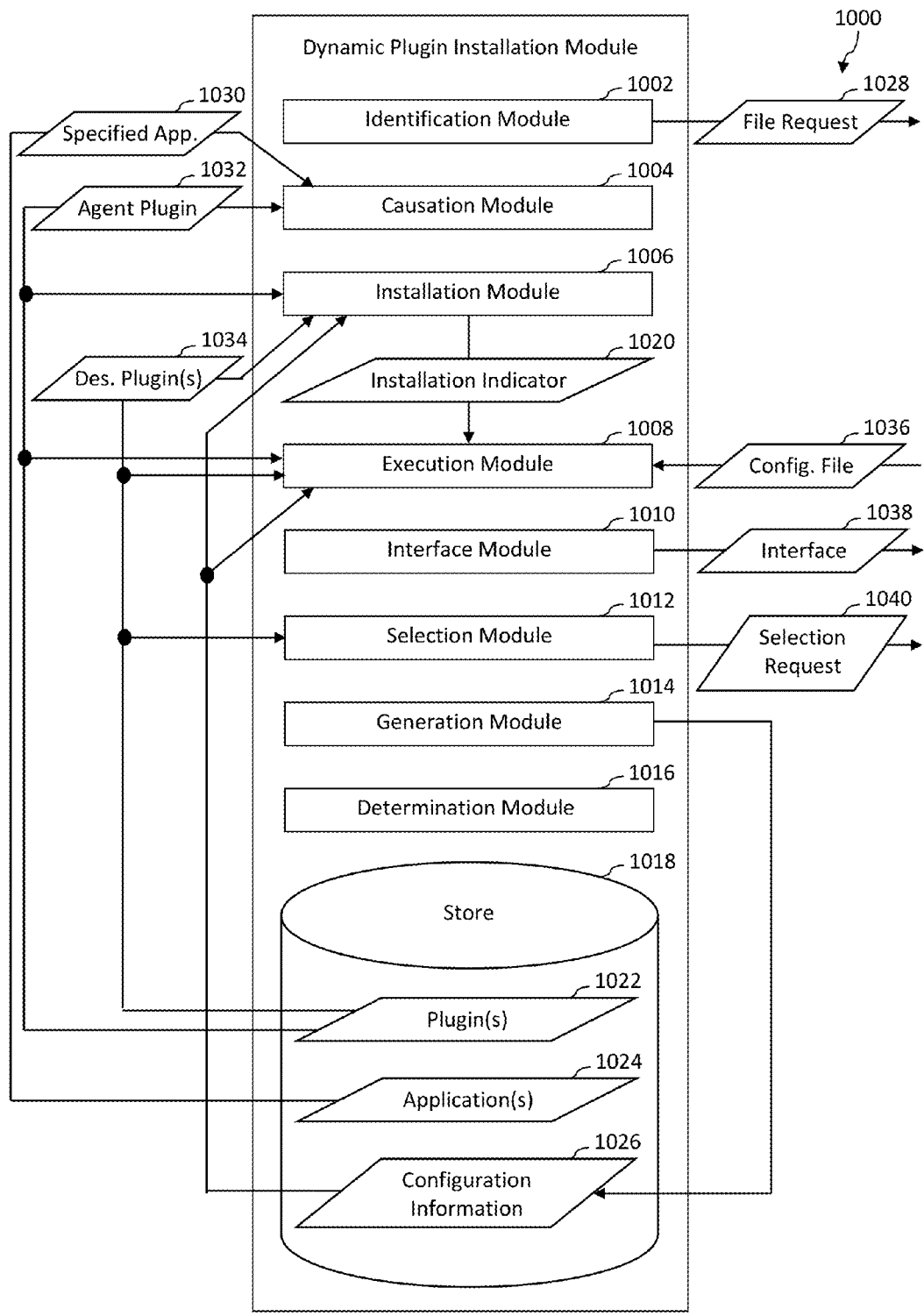
FIG. 10 is a block diagram of another example implementation of a dynamic plugin installation module shown in FIG. 1 in accordance with an embodiment.

In yet another example embodiment, the method of flowchart 600 includes one or more of the steps shown in FIG. 9. As shown in FIG. 9, the method of flowchart 900 begins at step 902. In step 902, the agent plugin is used to perform a first execution of the designated plugin(s). For instance, step 902 may be performed in response to using the agent plugin to install the designated plugin(s) at step 606 of flowchart 600. In an example implementation, execution module 1008 uses the agent plugin 1032 to perform a first execution of the designated plugin(s) 1034.

At step 904, a state of the first execution is identified. For instance, the state may be associated with certain configuration settings of the designated plugin(s). In an example implementation, identification module 1002 identifies the state of the first execution.

At step 906, a determination is made that the specified application is to be recycled. In an example implementation, determination module 1016 determines that the specified application is to be recycled. It will be recognized that "to be recycled" means "to be restarted". For instance, the determination that the specified application is to be recycled may be based on one or more factors, including but not limited to a determination that a machine (e.g., a physical machine or a virtual machine) on which the specified application is deployed is to be restarted (or has been restarted), detection of a hardware malfunction with regard to the machine on which the specified application is deployed, detection of a malfunction with regard to the specified application, a determination that an operating system associated with the specified application is to be upgraded, a determination that a platform on which the specified application is running has requested that the specified application be recycled, etc.

At step 908, the agent plugin is caused to run in a subsequent deployment of the specified application. The subsequent deployment is initiated after initiation of the first deployment. In an example implementation, causation module 1004 causes the agent plugin 1032 to run in a subsequent deployment of the specified application 1030.

At step 910, the agent plugin is used to re-install the designated plugin(s) dynamically based on the configuration information. In an example implementation, installation module 1006 uses the agent plugin 1032 to re-install the designated plugin(s) 1034 dynamically based on the configuration information 1026.

At step 912, the agent plugin is used to initiate a second execution of the designated plugin(s) in the state of the first execution. For instance, the agent plugin may be used to initiate the second execution using the certain configuration settings of the designated plugin(s) that are associated with the state of the first execution. In an example implementation, execution module 1008 uses the agent plugin to initiate a second execution of the designated plugin(s) 1034 in the state of the first execution.

It will be recognized that dynamic plugin installation module 1000 may not include one or more of identification module 1002, causation module 1004, installation module 1006, execution module 1008, interface module 1010, selection module 1012, generation module 1014, determination module 1016, and/or store 1018. Furthermore, dynamic plugin installation module 1000 may include modules in addition to or in lieu of identification module 1002, causation module 1004, installation module 1006, execution module 1008, interface module 1010, selection module 1012, generation module 1014, determination module 1016, and/or store 1018.

Dynamic plugin installation module 108, dynamic agent portal 202, identification module 1002, causation module 1004, installation module 1006, execution module 1008, interface module 1010, selection module 1012, generation module 1014, determination module 1016, flowchart 600, flowchart 700, flowchart 800, and flowchart 900 may be implemented in hardware, software, firmware, or any combination thereof.

For example, dynamic plugin installation module 108, dynamic agent portal 202, identification module 1002, causation module 1004, installation module 1006, execution module 1008, interface module 1010, selection module 1012, generation module 1014, determination module 1016, flowchart 600, flowchart 700, flowchart 800, and/or flowchart 900 may be implemented as computer program code configured to be executed in one or more processors.

In another example, dynamic plugin installation module 108, dynamic agent portal 202, identification module 1002, causation module 1004, installation module 1006, execution module 1008, interface module 1010, selection module 1012, generation module 1014, determination module 1016, flowchart 600, flowchart 700, flowchart 800, and/or flowchart 900 may be implemented as hardware logic/electrical circuitry.

For instance, in an embodiment, one or more of dynamic plugin installation module 108, dynamic agent portal 202, identification module 1002, causation module 1004, installation module 1006, execution module 1008, interface module 1010, selection module 1012, generation module 1014, determination module 1016, flowchart 600, flowchart 700, flowchart 800, and/or flowchart 900 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
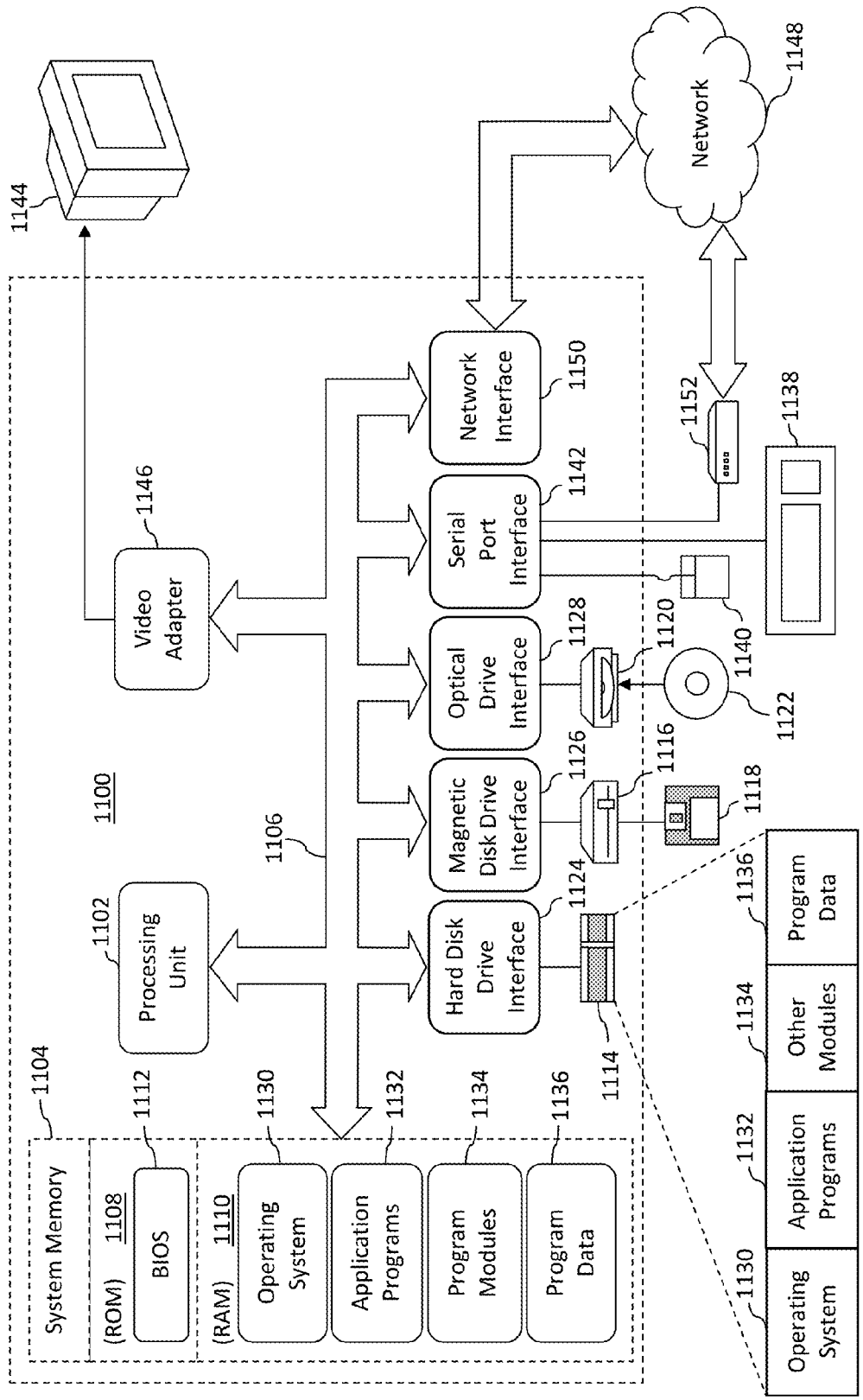
FIG. 11 depicts an example computer in which embodiments may be implemented.

FIG. 11 depicts an example computer 1100 in which embodiments may be implemented. Any one or more of the clients 102A-102M, any one or more of the plugin source(s) 110, or any one or more of servers 106A-106N shown in FIG. 1 (or any one or more subcomponents thereof shown in FIGS. 2-5 and 10) may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing dynamic plugin installation module 108, dynamic agent portal 202, identification module 1002, causation module 1004, installation module 1006, execution module 1008, interface module 1010, selection module 1012, generation module 1014, determination module 1016, flowchart 600 (including any step of flowchart 600), flowchart 700 (including any step of flowchart 700), flowchart 800 (including any step of flowchart 800), and/or flowchart 900 (including any step of flowchart 900), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable medium" are used to generally refer to media such as the hard disk associated with hard disk drive 1114, removable magnetic disk 1118, removable optical disk 1122, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Example Code Snippets

Following are three example code snippets, labeled "Example Code Snippet #1", "Example Code Snippet #2", and "Example Code Snippet #3", respectively.

A. Example Code Snippet #1

The code snippet below demonstrates an example feed for a plugin:

```
<?xml version="1.0" encoding="utf-8"?>
<feed xmlns="http://www.w3.org/2005/Atom">
  <webpiFile version="2.0.1.3" />
  <keywords />
  <languages>
    <language default="true">
      <languageId>en</languageId>
      <name resourceName="Lang_en_Name">English</name>
    </language>
  </languages>
  <entry>
    <productId>Microsoft.WindowsAzure.Plugins.TestAgent</productId>
    <title>Test Agent</title>
    <version>1.0.0.0</version>
    <summary />
    <installers>
      <installer>
        <id>1</id>
```

-continued

```
        <languageId>en</languageId>
        <installerFile>
          <fileSize>20</fileSize>
          <installerURL>https://dynamicagent.blob.core.windows.net/
dynamic-agent-plugins/microsoft.windowsazure.plugins.testagent/1.0.0.0/
plugin.cspluginx</installerURL>
          <sha1>
            493960AE4DB0A6EC0914AAC3FDC07D1F78D9331A</sha1>
        </installerFile>
        <installCommands>
          <unzip>
            <zipFile>%InstallerFile%</zipFile>
<targetDirectory>%WebPlatformInstallerInstallationCachePath%\
Microsoft.Windows Azure.Plugins.TestAgent\1.0.0.0
</targetDirectory>
          </unzip>
        </installCommands>
      </installer>
    </installers>
    <keywords />
  </entry>
</feed>
```

B. Example Code Snippet #2

The following code snippet demonstrates an example feed that is generated by the selection of two plugins:

```
<?xml version="1.0" encoding="utf-8"?>
<feed xmlns="http://www.w3.org/2005/Atom">
  <webpiFile version="2.0.1.3" />
  <keywords>
    <keyword id="Default" resourceName=
    "Keyword_Default">Default</keyword>
  </keywords>
  <languages>
    <language default="true">
      <languageId>en</languageId>
      <name resourceName="Lang_en_Name">English</name>
    </language>
  </languages>
  <entry>
    <productId>6c85078a-ffb5-4ef0-a373-3635d36fe85c</productId>
    <title />
    <version />
    <summary />
    <dependency>
      <and>
        <dependency>
          <productId>IntelliTrace</productId>
        </dependency>
        <dependency>
          <productId>Microsoft.WindowsAzure.Plugins.-
TestAgent</productId>
        </dependency>
      </and>
    </dependency>
    <keywords>
      <keywordId>Default</keywordId>
    </keywords>
  </entry>
</feed>
```

C. Example Code Snippet #3

The following code snippet demonstrates an example configuration file that is generated by the selection of two plugins:

```
<?xml version="1.0" encoding="utf-8"?>
<Settings id="3911d90d-c6cc-4908-a8cf-d5a43c0b8823"
name="Test Application"
xmlns="http://schemas.microsoft.com/DynamicAgent/2011/07/Settings">
  <Plugins>
    <Plugin name="IntelliTrace" version="1.5.0.0">
```

-continued

```
<ConfigurationSettings>
    <Setting name="IntelliTrace.IntelliTraceConnectionString"
value="BaseEndpoint=core.windows.net;Protocol=http;AccountName=
<name>;Account Key=<key>" />
    </ConfigurationSettings>
  </Plugin>
  <Plugin name="Microsoft.WindowsAzure.Plugins.TestAgent"
version="1.0.0.0">
    <ConfigurationSettings>
      <Setting name="Microsoft.WindowsAzure.Plugins.TestAgent.-
TestSetting" value="Howdy!" />
    </ConfigurationSettings>
  </Plugin>
 </Plugins>
</Settings>
```

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
identifying configuration information regarding a specified application, the configuration information indicating that at least one designated plugin selected from one or more plugins, which are stored in a location that is accessible to deployed applications, is to be installed in response to the specified application being deployed;
causing an agent plugin, which is separate from the specified application, to run in a first deployment of the specified application, the specified application being packaged to include the agent plugin; and
using the agent plugin to install the at least one designated plugin based on the configuration information in response to causing the agent plugin to run in the first deployment of the specified application.

2. The method of claim 1, wherein the configuration information further indicates one or more dependencies of the specified application; and
wherein the method further comprises:
using the agent plugin to install the one or more dependencies based on the configuration information.

3. The method of claim 2, wherein the configuration information further indicates at least one dependency of the at least one designated plugin; and
wherein the method further comprises:
using the agent plugin to install the at least one dependency of the at least one designated plugin based on the configuration information.

4. The method of claim 1, wherein identifying the configuration information comprises:
identifying a feed that includes the at least one designated plugin, location information regarding a location of the at least one designated plugin, and installation information that includes instructions for installing the at least one designated plugin; and wherein using the agent plugin to install the at least one designated plugin comprises:
using the agent plugin to install the at least one designated plugin based on the location information and the installation information.

5. The method of claim 1, wherein each of the at least one designated plugin includes a respective plurality of executable binaries;
wherein the configuration information indicates for each of the at least one designated plugin a respective subset of the respective plurality of executable binaries; and
wherein the method further comprises:
using the agent plugin to execute each subset based on the configuration information.

6. The method of claim 1, wherein identifying the configuration information comprises:
identifying a predetermined configuration file that indicates at least one configuration setting for each of the at least one designated plugin; and
wherein the method further comprises:
using the agent plugin to execute the at least one designated plugin based on the predetermined configuration file in response to using the agent plugin to install the at least one designated plugin.

7. The method of claim 1, wherein identifying the configuration information comprises:
requesting a configuration file that corresponds to the first deployment of the specified application from a web application via which the configuration file is generated; and
receiving the configuration file from the web application, the configuration file indicating at least one configuration setting for each of the at least one designated plugin; and
wherein the method further comprises:
using the agent plugin to execute the at least one designated plugin based on the configuration file in response to using the agent plugin to install the at least one designated plugin.

8. The method of claim 1, further comprising:
providing an interface via which the one or more plugins are uploaded by one or more users;
selecting the at least one designated plugin from the one or more plugins based on first user-initiated instructions that specify the at least one designated plugin; and
generating the configuration information to include configuration settings of the at least one designated plugin, the configuration settings being specified by second user-initiated instructions.

9. The method of claim 8, further comprising:
selecting one or more dependencies of the specified application based on third user-initiated instructions that specify the one or more dependencies.

10. A system comprising:
at least one element including at least one of physical hardware logic or electrical circuitry that is capable of processing;
an identification module configured to identify configuration information regarding a specified application, the configuration information indicating that at least one designated plugin selected from one or more plugins, which are stored in a location that is accessible to deployed applications, is to be installed in response to the specified application being deployed;
a causation module, implemented using the at least one element, configured to cause an agent plugin to run along with the specified application in a first deployment of the specified application, the specified application being packaged to include the agent plugin; and an installation module configured to use the agent plugin to install the at least one designated plugin on-the-fly while the specified application is running based on the configuration information in response to the agent plugin being caused to run in the first deployment of the specified application, the at least one designated plugin usable by the specified application without recompilation of the specified application.

11. The system of claim 10, wherein the configuration information further indicates one or more dependencies of the specified application; and wherein the installation module is further configured to use the agent plugin to install the one or more dependencies based on the configuration information.

12. The system of claim 11, wherein the configuration information further indicates at least one dependency of the at least one designated plugin; and wherein the installation module is further configured to use the agent plugin to install the at least one dependency of the at least one designated plugin based on the configuration information.

13. The system of claim 10, wherein the identification module is configured to identify a feed that includes the at least one designated plugin, location information regarding a location of the at least one designated plugin, and installation information that includes instructions for installing the at least one designated plugin; and wherein the installation module is configured to use the agent plugin to install the at least one designated plugin on-the-fly while the specified application is running based on the location information and the installation information.

14. The system of claim 10, wherein each of the at least one designated plugin includes a respective plurality of executable binaries;

wherein the configuration information indicates for each of the at least one designated plugin a respective subset of the respective plurality of executable binaries; and wherein the system further comprises:

an execution module configured to use the agent plugin to execute each subset based on the configuration information.

15. The system of claim 10, further comprising:

an interface module configured to provide an interface via which the one or more plugins are uploaded by one or more users;

a selection module configured to select the at least one designated plugin from the one or more plugins based on first user-initiated instructions that specify the at least one designated plugin; and a generation module configured to generate the configuration information to include configuration settings of the at least one designated plugin, the configuration settings being specified by second user-initiated instructions.

16. The system of claim 15, wherein the selection module is further configured to select one or more dependencies of the specified application based on third user-initiated instructions that specify the one or more dependencies.

17. The system of claim 10, further comprising:

an execution module configured to use the agent plugin to perform a first execution of the at least one designated plugin in response to using the agent plugin to install the at least one designated plugin; and a determination module configured to determine whether the specified application is to be recycled;

wherein the identification module is further configured to identify a state of the first execution;

wherein the causation module is further configured to cause the agent plugin to run in a subsequent deployment of the specified application in response to a determination that the specified application is to be recycled, the subsequent deployment being initiated after initiation of the first deployment;

wherein the installation module is further configured to use the agent plugin to re-install the at least one designated plugin on-the-fly while the specified application is running based on the configuration information in response to causing the agent plugin to run in the subsequent deployment of the specified application; and wherein the execution module is further configured to use the agent plugin to initiate a second execution of the at least one designated plugin in the state of the first execution in response to using the agent plugin to re-install the at least one designated plugin.

18. The system of claim 10, further comprising:

a determination module configured to determine whether the configuration information is changed while the specified application is running;

wherein the installation module is further configured to use the agent plugin to install one or more second designated plugins on-the-fly while the specified application is running based on changed configuration information in response to a determination that the configuration information is changed to provide the changed configuration information, the changed configuration information indicating that the one or more second designated plugins are to be installed, the configuration information prior to being changed not indicating that the one or more second designated plugins are to be installed.

19. A computer program product comprising a computer-readable storage medium having computer program logic recorded thereon for enabling a processor-based system to install at least one designated plugin with respect to a specified application, the computer program product comprising:

a first program logic module for enabling the processor-based system to identify configuration information regarding the specified application, the configuration information indicating that the at least one designated plugin selected from one or more plugins, which are stored in a location that is accessible to deployed applications, is to be installed in response to the specified application being deployed;

a second program logic module for enabling the processor-based system to cause an agent plugin to run along with the specified application in a first deployment of the specified application across a plurality of machines in a cloud environment, the specified application being packaged to include the agent plugin;

a third program logic module for enabling the processor-based system to determine whether the configuration information is changed while the specified application is running; and a fourth program logic module for enabling the processor-based system to use the agent plugin to install the at least one designated plugin on-the-fly while the specified application is running based on the configuration information in response to the agent plugin being caused to run in the first deployment of the specified application and for enabling the processor-based system to use the agent plugin to install one or more second designated plugins on-the-fly while the specified application is running based on changed configuration information in response to a determination that the configuration information is changed to provide the changed configuration information, the changed configuration information indicating that the one or more second designated plugins are to be installed, the configuration information prior to being changed not indicating that the one or more second designated plugins are to be installed, the one or more second designated plugins usable by the specified application without recompilation of the specified application.

20. The computer program product of claim 19, wherein the first program logic module includes logic for enabling the processor-based system to identify a feed that includes the at least one designated plugin, location information regarding a location of the at least one designated plugin, and installation information that includes instructions for installing the at least one designated plugin; and wherein the fourth program logic module includes logic for enabling the processor-based system to use the agent plugin to install the at least one designated plugin on-the-fly while the specified application is running based on the location information and the installation information.

21. The method of claim 1, wherein causing the agent plugin to run comprises:
causing the agent plugin to run along with the specified application in the first deployment of the specified application.

22. The method of claim 1, wherein using the agent plugin comprises:
using the agent plugin to install the at least one designated plugin while the specified application is running; and
wherein the at least one designated plugin is usable by the specified application without recompilation of the specified application.

23. A system comprising:
at least one element including at least one of physical hardware logic or electrical circuitry that is capable of processing; and
a causation module, implemented using the at least one element, configured to cause an agent plugin, which is separate from the specified application, to run in a first deployment of the specified application, the specified application being packaged to include the agent plugin, the agent plugin configured to install at least one designated plugin in response to the agent plugin being caused to run in the first deployment of the specified application.

24. The system of claim 23, wherein the specified application is packaged to include the agent plugin prior to the first deployment of the specified application.

25. The system of claim 23, wherein the agent plugin is configured to install the at least one designated plugin on-the-fly while the specified application is running based on the at least one designated plugin being indicated by configuration information regarding the specified application.

26. The system of claim 25, wherein the agent plugin is further configured to install one or more dependencies of the specified application on-the-fly while the specified application is running based on the one or more dependencies of the specified application being indicated by the configuration information.

27. The system of claim 25, wherein the agent plugin is further configured to install one or more dependencies of the at least one designated plugin on-the-fly while the specified application is running based on the one or more dependencies of the at least one designated plugin being indicated by the configuration information.

28. The system of claim 25, further comprising:
a determination module configured to determine whether the configuration information is changed while the specified application is running;
wherein the agent plugin is configured to install one or more second designated plugins on-the-fly while the specified application is running based on changed configuration information in response to a determination that the configuration information is changed to provide the changed configuration information, the changed configuration information indicating that the one or more second designated plugins are to be installed, the configuration information prior to being changed not indicating that the one or more second designated plugins are to be installed.

29. The system of claim 23, further comprising:
an identification module configured to identify a feed that includes the at least one designated plugin, location information regarding a location of the at least one designated plugin, and installation information that includes instructions for installing the at least one designated plugin;
wherein the agent plugin is configured to install the at least one designated plugin on-the-fly while the specified application is running based on the location information and the installation information.

30. The system of claim 23, wherein each of the at least one designated plugin includes a respective plurality of executable binaries;
wherein the configuration information indicates for each of the at least one designated plugin a respective subset of the respective plurality of executable binaries; and
wherein the agent plugin is further configured to execute each subset based on the configuration information.

31. The system of claim 23, further comprising:
an interface module configured to provide an interface via which the one or more plugins are uploaded by one or more users;
a selection module configured to select the at least one designated plugin from the one or more plugins based on first user-initiated instructions that specify the at least one designated plugin; and
a generation module configured to generate the configuration information to include configuration settings of the at least one designated plugin, the configuration settings being specified by second user-initiated instructions.

32. The system of claim 31, wherein the selection module is further configured to select one or more dependencies of the specified application based on third user-initiated instructions that specify the one or more dependencies.

33. The system of claim 23, wherein the agent plugin is further configured to perform a first execution of the at least one designated plugin in response to the at least one designated plugin being installed;
wherein the system further comprises:
a determination module configured to determine whether the specified application is to be recycled; and
an identification module configured to identify a state of the first execution;
wherein the causation module is further configured to cause the agent plugin to run in a subsequent deployment of the specified application in response to a determination that the specified application is to be recycled, the subsequent deployment being initiated after initiation of the first deployment;

wherein the agent plugin is configured to re-install the at least one designated plugin on-the-fly while the specified application is running based on the configuration information in response to the agent plugin being caused to run in the subsequent deployment of the specified application; and wherein the agent plugin is configured to initiate a second execution of the at least one designated plugin in the state of the first execution in response to the at least one designated plugin being re-installed.

* * * * *